(12) United States Patent
Kirschner et al.

(10) Patent No.: US 10,339,833 B2
(45) Date of Patent: Jul. 2, 2019

(54) ASSISTIVE READING INTERFACE

(71) Applicant: Microsoft Technology Licensing, LLC, Redmond, WA (US)

(72) Inventors: Douglas R. Kirschner, Seattle, WA (US); Nicholas H. Wrem, Seattle, WA (US); Jason Anthony Grieves, Redmond, WA (US); Amish Patel, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 15/656,825

(22) Filed: Jul. 21, 2017

(65) Prior Publication Data
US 2017/0323585 A1  Nov. 9, 2017

Related U.S. Application Data

(63) Continuation of application No. 13/361,585, filed on Jan. 30, 2012, now abandoned.

(60) Provisional application No. 61/533,583, filed on Sep. 12, 2011.

(51) Int. Cl.
*G09B 21/00* (2006.01)
*G06F 3/0488* (2013.01)

(52) U.S. Cl.
CPC .......... *G09B 21/006* (2013.01); *G06F 3/0488* (2013.01)

(58) Field of Classification Search
CPC ............... G06F 3/0488; G06F 15/0291; G06F 3/04842; G06F 3/0416; G06F 3/0483; G10L 13/00; G10L 13/043; G10L 13/08; G10L 13/02; G09B 5/062; G09B 5/065; G09B 17/003; G09B 21/006
See application file for complete search history.

(56) References Cited

U.S. PATENT DOCUMENTS

| 5,875,428 A | 2/1999 | Kurzweil et al. |
| 6,154,757 A | 11/2000 | Krause et al. |
| 7,900,145 B2 * | 3/2011 | Blinnikka ............. G06F 3/0481 345/173 |

(Continued)

OTHER PUBLICATIONS

"Sony Reader Touch Edition", Retrieved on: Oct. 27, 2011, 5 pages Available at: http://www.mobiletechreview.com/gadgets/Sony-Reader-Touch-Edition-PRS-600.htm.
"Universal Design", Retrieved on: Oct. 27, 2011, 108 pages Available at: www.kennesaw.edu/stu_dev/dsss/accessibletechnology.ppt.
"Technology and People Who Are Blind or Visually Impaired", Retrieved on: Oct. 27, 2011, 70 pages Available at: http://www.afb.org/afbpress/pub.asp?DocID=aw1103toc&All.

(Continued)

*Primary Examiner* — Angela A Armstrong
(74) *Attorney, Agent, or Firm* — Arent Fox LLP

(57) ABSTRACT

A screen reader for a computing device with a touch sensitive user interface. The screen reader operates in an investigatory mode in which touch inputs detected through the user interface are interpreted as inputs designating content on the display to verbally render. Each selection may be interpreted as designating a unit of content at the designated location. The size of the unit may be determined based on a direction of motion of pointing device arriving at the location on the display where the unit of content is designated. In this way, a user may, through simple and intuitively learned commands, designate content in units of different sizes such as characters, words, lines or paragraphs, when the content is text, and/or individual user interface elements when the displayed content being selected includes graphical elements.

19 Claims, 7 Drawing Sheets

(56) References Cited

U.S. PATENT DOCUMENTS

| | | | |
|---|---|---|---|
| 8,112,716 B2* | 2/2012 | Kobayashi | G06F 3/0481 715/784 |
| 8,239,201 B2* | 8/2012 | Conkie | G06F 3/0482 345/168 |
| 8,370,151 B2 | 2/2013 | Kurzweil et al. | |
| 8,452,600 B2 | 5/2013 | Fleizach | |
| 8,498,400 B2 | 7/2013 | Conkie et al. | |
| 8,498,866 B2 | 7/2013 | Kurzweil et al. | |
| 8,498,867 B2 | 7/2013 | Kurzweil et al. | |
| 8,548,813 B2 | 10/2013 | Hendricks et al. | |
| 2010/0235729 A1 | 9/2010 | Kocienda et al. | |
| 2010/0313125 A1 | 12/2010 | Fleizach et al. | |
| 2011/0050592 A1 | 3/2011 | Kim et al. | |
| 2011/0050593 A1 | 3/2011 | Kim et al. | |
| 2011/0167350 A1* | 7/2011 | Hoellwarth | G06F 3/0483 715/727 |
| 2011/0320206 A1 | 12/2011 | Chen et al. | |
| 2012/0306772 A1* | 12/2012 | Tan | G06F 3/0488 345/173 |

OTHER PUBLICATIONS

Tabatabaei, Manouchehr, "Information Technology for Protected Individuals: A Survey of Current Status", In Disability Studies Quarterly, the First Journal in the Field of Disability Studies, vol. 22, Issue 2. 2002, pp. 159-174.

"Vision", Retrieved on: Oct. 27, 2011, 4 pages Available at: http://www.apple.com/accessibility/ipad/vision.html.

"Final Office Action Issued in U.S. Appl. No. 13/361,585", dated Oct. 23, 2014, 15 Pages.

"Final Office Action Issued in U.S. Appl. No. 13/361,585", dated Oct. 8, 2015, 16 Pages.

"Final Office Action Issued in U.S. Appl. No. 13/361,585", dated Apr. 21, 2017, 15 Pages.

"Non-Final Office Action Issued in U.S. Appl. No. 13/361,585", dated Mar. 27, 2014, 14 Pages.

"Non-Final Office Action Issued in U.S. Appl. No. 13/361,585", dated Jun. 27, 2016, 11 Pages.

"Non-Final Office Action Issued in U.S. Appl. No. 13/361,585", dated Feb. 17, 2015, 15 Pages.

* cited by examiner

ASSISTIVE READING INTERFACE

RELATED APPLICATION

This application is a continuation of U.S. Non-Provisional patent application Ser. No. 13/361,585, filed Jan. 30, 2012, entitled "Assistive Reading Interface," which claims priority under 35 U.S.C. § 119(e) to U.S. Provisional Application No. 61/533,583, filed Sep. 12, 2011, entitled "Assistive Reading Interface," both of which are incorporated herein in its entirety by reference.

BACKGROUND

It is known to equip a computing device with a screen reader for rendering information to a user verbally. Such a capability can be of significant benefit to computer users who are visually impaired. A visually impaired user, for example, can command the computer to read text or to indicate using speech what controls or other objects are on being displayed.

Such assistive reading facilities may operate in different modes. In some modes, for example, the computing device may render text or other information verbally as content is generated for presentation to the user. In such a mode, information is rendered verbally analogously to how it might be displayed visually in a graphical user interface.

In other modes, a user may select different locations on a computer screen, such as by hitting various combinations of keys on a keyboard to indicate a particular location, and the computer will render verbally what is at that location. When a keyboard interface is used, the screen reader may recognize multiple keystroke combinations as commands that can specify which content, as displayed on the screen, is to be rendered verbally. The keystroke combination may also implicitly indicate how much content is to be rendered. For example, different keystroke commands may allow a user to step through rendered content a word at a time or a paragraph at a time.

It is known to provide a screen reader for a computer with a touch screen. Rather than indicating a location through keyboard commands, the user may indicate a location by touching the screen. Such a touch may indicate which content to render verbally. The screen reader may be used in connection with keyboard commands, which may control how much content, such as a word or paragraph, is rendered verbally from the designated location.

SUMMARY

An improved user experience may be provided through an improved control technique for a computing device providing an assistive reading interface. The interface may operate in an investigatory mode in which a user may designate locations on a display. The computing device may then verbally render information based on the content displayed at the designated location of the display. The amount of content rendered for each selection may be controlled by the user based on the direction of motion of the a pointing device used to designate locations on the display.

In some embodiments, motion in a first direction may result in selection of a first amount of content to be rendered verbally. Motion in a second direction, transverse to the first direction, may result in selection of a second amount of content being rendered. As a specific example, when content comprises text arranged in lines, the first direction may be generally along lines of text and the second direction may generally be in a direction crossing lines of text. The first amount of content may be a designated word. The second amount of content may be a designated line.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1:
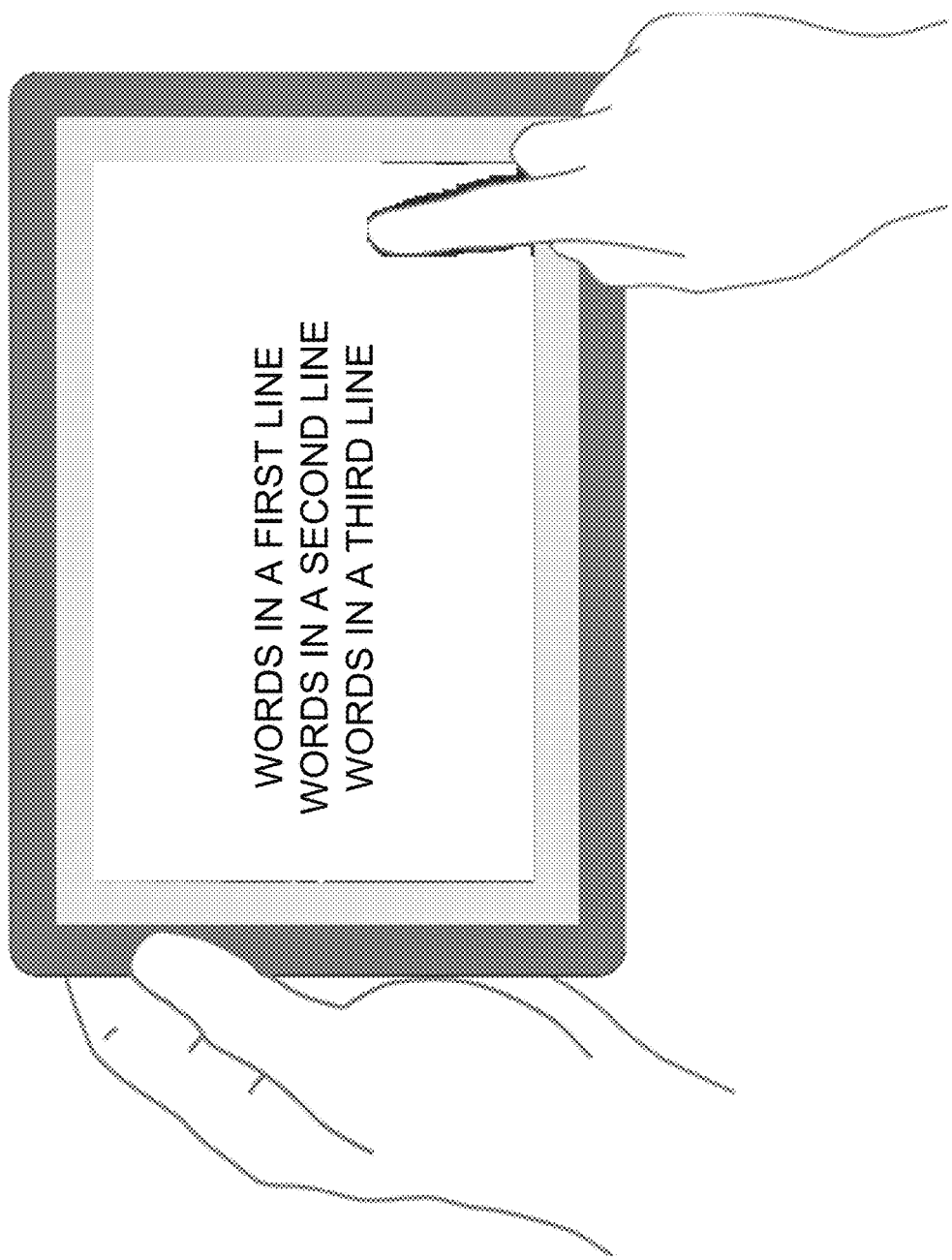
FIG. 1 is a sketch of an environment in which an assistive reading interface may be used on a touchscreen.

The inventor has recognized and appreciated that an enhanced user experience could be provided for a assistive reading interface of a computing device by providing an improved mechanism for a user to designate content that is to be rendered verbally. Such an interface may provide a simple mechanism for a user to designate different amounts of content, using relatively simple commands. The amount of content to be rendered may be designated based on direction of motion of a pointing device across a user interface. In addition to avoiding the need for the user to memorize complex keystroke combinations or gestures on a touch screen, the interface may avoid the need for the user to make gestures that could also be used to control applications. In this way, the possibility is reduced of ambiguous commands to the computing device that could create the appearance of inconsistent operation. As a result, the user experience with the assistive reading device may be faster to use, easier to learn, intuitive and natural.

Such a mechanism is well suited for use on a touch screen in which the pointing device may be a finger of the user and options for command formats may be more limited than when input is provided through a keyboard. Using such an interface, a user is provided with a simple way to investigate content visually rendered on the display at a pace that is consistent with the user's interest at the time.

For text based content, a quantity of content rendered vocally in response to a user indication of content may depend on a direction of motion of a pointing device across the user interface. For example, if the user moves the pointing device along a line of text, the user interface may verbally render content in units of words as motion of the pointing device moves to designates successive words being displayed. Conversely, when the user moves the pointing device transverse to the lines of text, the user interface may verbally render content in units of lines as the pointing device moves to designate successive lines being displayed.

Motion in any number of directions may be recognized by the user interface. For example, the interface may recognize motion in four directions: forward and backward motion and also up and down motion. In such an embodiment, by detecting direction of motion, the user interface may recognize commands for rendering units of content in four different sizes. These different commands may map to commands to render content a word at a time, a character at a time, a line at a time, a paragraph at a time or in larger units.

Though, it should be recognized that the such an interface is not limited to rendering text-based content. In some embodiments, an assistive reading interface may generate speech output stating a name, label or other descriptive content associated with graphical content forming a user interface element, such as a control or other icon. The amount of such graphical content rendered verbally may depend on motion of the pointing device across the screen such that, for motion in a first direction, information is provided verbally for each user interface element indicated by the pointed device. For motion of the pointing device in a second direction, information is provided for a group of user interface elements based on the layout of those user interface elements.

As a result, the user interface provides a user with an ability to investigate contents of a display with varying levels of precision. Although users often want to hear a large block of text in its entirety, there are times when higher level of precision is needed (for example to find a specific word to start a selection). To be able to simply designate the size of the unit of content selected facilitates such an exploration.

Moreover, such an interface may be useful for relatively dense text on a touch screen interface. In such an interface, positioning a finger to designate precisely a specific location on the screen may be difficult. However, through an interface that operates in an investigatory mode in which a user can simply designate quantities of text, a user, particularly a visually impaired user, may quickly identify a desired location on the screen. For this reason, an interface technique as described herein may be well suited for use with portable electronic devices, including those with relatively small touch screens, including smart phones.

In accordance with some embodiments, to investigate and read text on the screen, the user drags a single finger or other pointing device over the text area. While the finger movement is primarily down (within 45 degrees of downward, for example), the screen reader reads by line. When the finger movement becomes primarily horizontal, the screen reader switches to reading by word.

In some embodiments, the screen reader can differentiate between rightward and leftward movements to read by word or character. Also, optionally, the screen reader can switch between line and paragraph reading modes by distinguishing between upward and downward movements.

Such an approach to controlling a screen reader allows for direct investigation of text and does not require any gestures to specify the amount of content to be rendered. Because there are a limited number of simple touch gestures that a conventional touch screen device can reliably recognize (fewer than there are keyboard shortcuts), avoiding scenario-specific gestures leaves those gestures available for other commands. Such an interface is easy to learn because it uses an existing paradigm of direct investigation with a single finger. The different behaviors are easily discoverable and easy to understand.

Moreover, the interface gives the user the ability to hear larger blocks of text (e.g. a whole line or paragraph) while providing a way to hear individual words or, in some embodiments, characters. Accordingly, it integrates seamlessly with the rest of the direct investigation experience. In this way the user can naturally investigate text with varying levels of precision depending on their direction of finger movement.

An example of the use of such a screen reader in connection with a graphical user interface is provided in connection with FIG. 1. FIG. 1 illustrates a computing device with a touchscreen interface. Such a computing device may be constructed using techniques as are known in the art. The touchscreen, for example, may detect a user's finger or other pointing device pressing on or brought near the surface of the touchscreen. Motion across the surface of the touchscreen may be detected by a touchscreen controller that outputs indications of motion of the user's finger or other pointing device. The computing device in the example of FIG. 1 may be implemented with conventional components for performing these functions or in any other suitable way.

The output of the touch controller may be processed within the operating system of the computing device or by any other suitable component. As a specific example, the operating system may include components that interface with the touch controller. The operating system may route user input received through the touch controller to an appropriate component. Such routing may be performed using techniques as are known in the art or in any other suitable way. In the operating state illustrated in the example of FIG. 1, a user has enabled a screen reader utility in the operating system. Accordingly, user inputs received through the touchscreen interface may be routed to the screen reader. Such routing may be performed using techniques as are known in the art.

In the example of FIG. 1, the screen reader may operate in multiple modes. In some modes, the screen reader may render content verbally as it is displayed. In this way, a visually impaired user may hear content as applications or other components executing on the computing device generated and presented for display.

The screen reader may also support an investigatory mode of operation. In the investigatory mode, the user may indicate locations on the touchscreen. Content may be designated by the user touching the touchscreen with the pointing device, which in this example, is simply the user's finger. In response to a designation of a location on the touchscreen, the screen reader may render verbally that content. A screen reader that verbally renders designated content may be implemented using techniques as are known in the art or may be implemented in any other suitable way.

In contrast to conventional screening, a screen reader as described herein may, in response to a user indication of a location on the display, verbally render an amount of content selected based on a direction of motion of the pointing device, which is the user's finger in this example.

Figure 2:
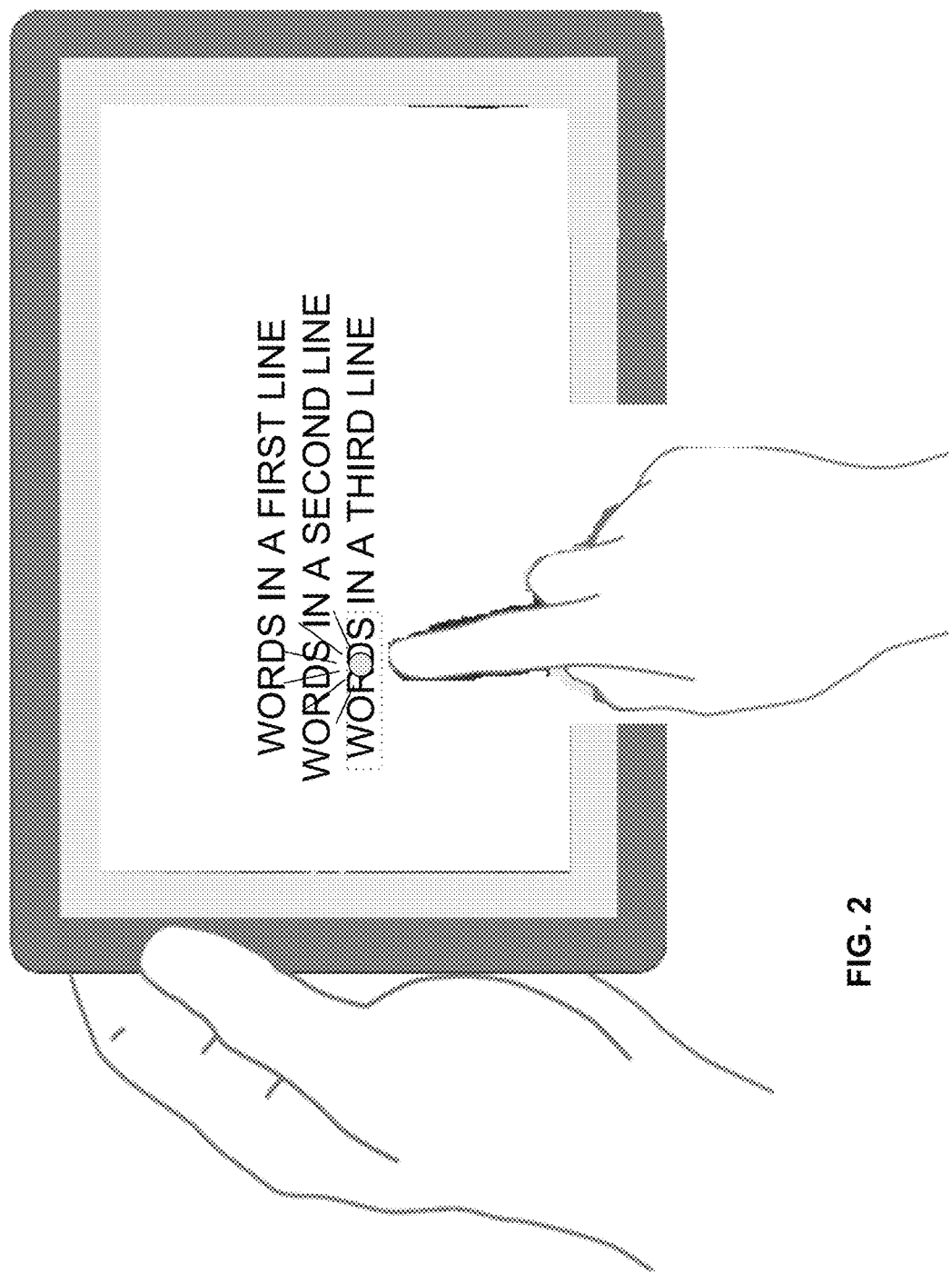
FIG. 2 is a sketch of the graphical user interface of the computing device illustrated in FIG. 1 in which a user has designated content displayed in the graphical user interface.

In the example of FIG. 2, the computing device is operating in an investigatory mode. The computing device may have been placed in the investigatory mode in any suitable way, such as, for example, by user input through the keyboard. FIG. 2 illustrates the computing device of FIG. 1 in an operating state in which the user has moved a finger to indicate a location on the touchscreen where a word is being displayed. In response to this indication of a location on the touchscreen, the screen reader may read the indicated word. The word may be read using a text-to-speech converter that drives a speaker as is known in the art, though any suitable approach for verbally rendering content may be used.

Figure 3:
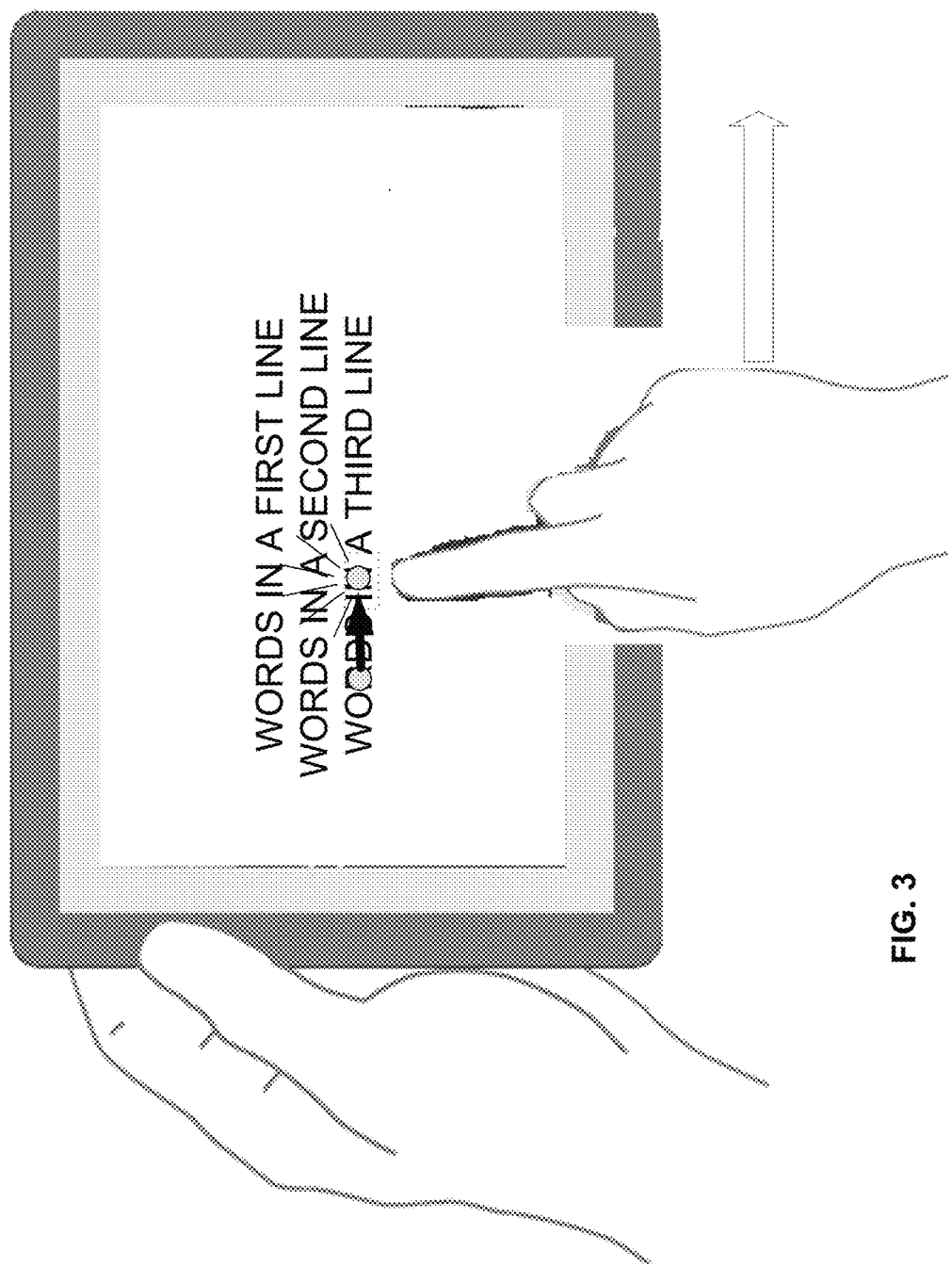
FIG. 3 is a sketch of the graphical user interface of the computing device illustrated in FIG. 2 at a subsequent time when a user has further indicated content on the display.

FIG. 3 illustrates the computing device of FIG. 2 at a later instant in time as the user is moving the finger across the display. In this example, content on the display is formatted as lines of text. The direction of motion of the user's finger is generally along a line of text. In the embodiment illustrated in FIG. 3, motion along a line of text indicates to the screen reader a selection of content in units of words of text. Accordingly, as the user has moved the finger from one word to an adjacent word, the screen reader interprets this input as a command to read each word individually.

Figure 4:
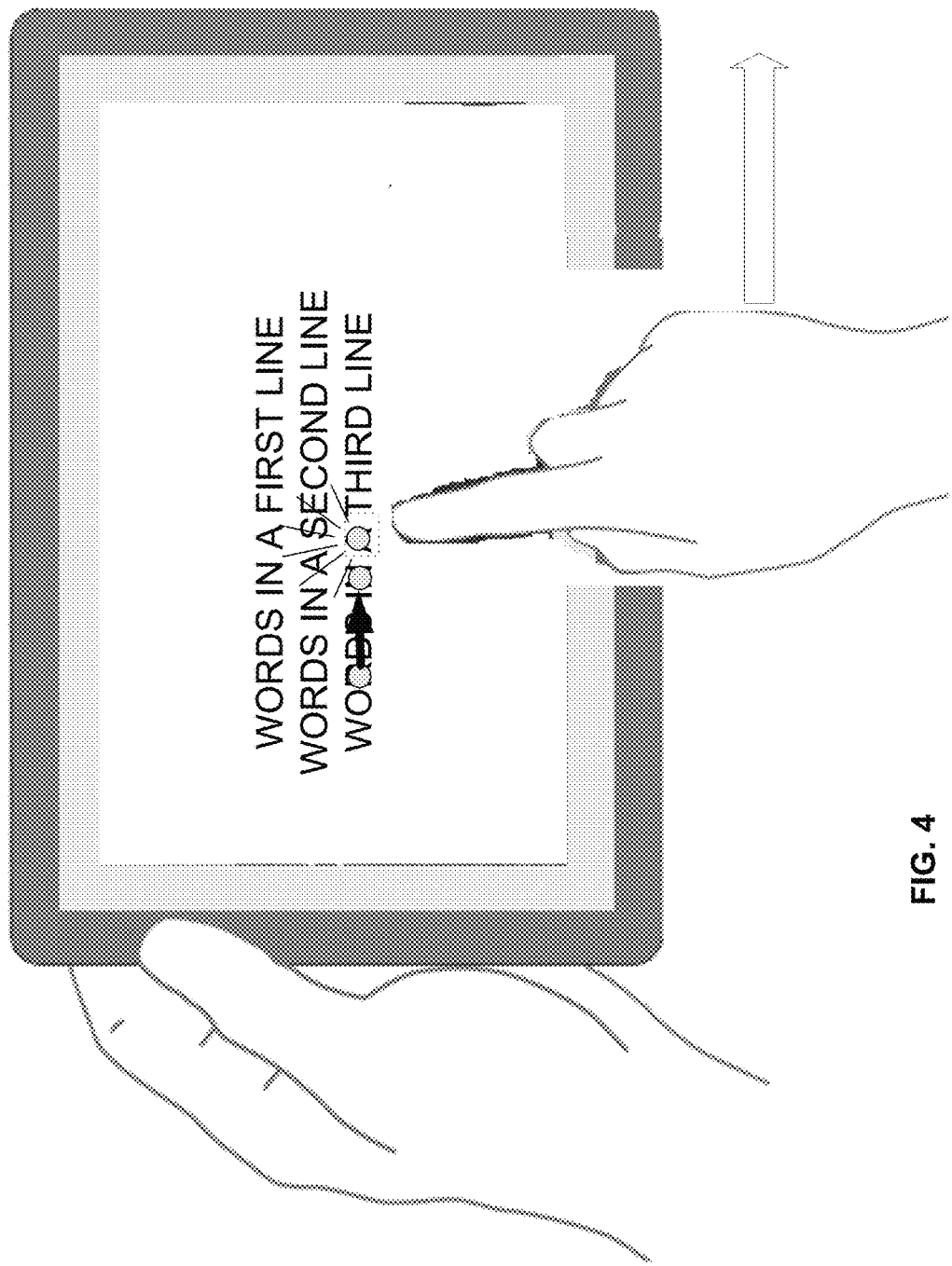
FIG. 4 is a sketch of the graphical user interface of the computing device of FIG. 3 at a subsequent time at which the user has further indicated content.

FIG. 4 illustrates the computing device of FIG. 3 as the user has contacted the screen at a location that is generally along the same line of text containing the words designated in FIGS. 2 and 3. Accordingly, the screen reader interprets such user input as a command to read a word in the location designated on the touchscreen.

In the sequence of interactions from FIGS. 2 to 3, the user may have slid a finger across the touchscreen, continuously making contact with the touchscreen. The screen reader may interpret such motion as a command to read words as the finger passes over them. In the sequence from FIGS. 3 to 4, the user may have lifted the finger after the sliding motion illustrated in FIG. 3 ended but subsequently placed the finger on the user interface as indicated in FIG. 4. In the embodiment illustrated, because the motion designated by the touch illustrated in FIG. 4 is generally in the same direction as the sliding motion illustrated between FIGS. 2 and 3, the touch input illustrated in FIG. 4 is similarly interpreted as a command to read a word displayed on the user interface at a location indicated by that touch.

Accordingly, it should be appreciated that it is not critical to the invention whether motion across the touch screen occurs as either a continuous sliding motion or as a series of contact a different locations. Any suitable gesture, or combination of gestures from which a direction of motion can be inferred, may be interpreted as a command illustrating a direction of motion. Though, in embodiments in which a continuous contact is not required, a mechanism may be incorporated to differentiate between successive contacts that are to be interpreted together versus as separate gestures. Such a determination may be based on time between contacts or relative location of a contact and successive contact. Regardless of the criteria used to distinguish, if successive contacts are to be interpreted together, the direction of motion may be inferred based on the change in position of the contact locations and the unit of content read at each contact may be determined based on that direction.

If a successive contact is not to be interpreted as the start of a separate motion, the unit content read at that contact may be a selected to be of a default size. For example, in some embodiments, an initial contact of a motion will not have a direction associated with it, such that a default unit of content, such as a word or single user interface element, may be verbally rendered at the first contact. Though, in some embodiments, at the first contact of a motion, the unit of content most recently read may be used as the default unit of content. For example, if, as part of the most recent motion, the unit of content read was a line or paragraph, at the first contact of a new motion, the screen reader may initially begin to read a unit of content of a similar size. Though, if the user then indicates an adjacent word as a result of motion in a direction along a line to signify reading of smaller units of content, the screen reader may interrupt the reading of the longer unit of content and enter a mode of reading individual words as they are indicated.

In the examples of FIGS. 2, 3 and 4, the direction of motion is indicated to be generally parallel with lines of text appearing on the display. In this example, the motion is generally horizontal. In some embodiments, a computing device, such as a handheld computing device, may render text with an orientation that depends on the orientation of the computing device. In such an embodiment, a computing device may include one or more sensors to detect its orientation. Accordingly, a screen reader may interpret motion of a pointing device across the screen in a way that depends on the orientation of the computing device and/or the orientation of text as rendered on the screen of the computing device.

Figure 5:
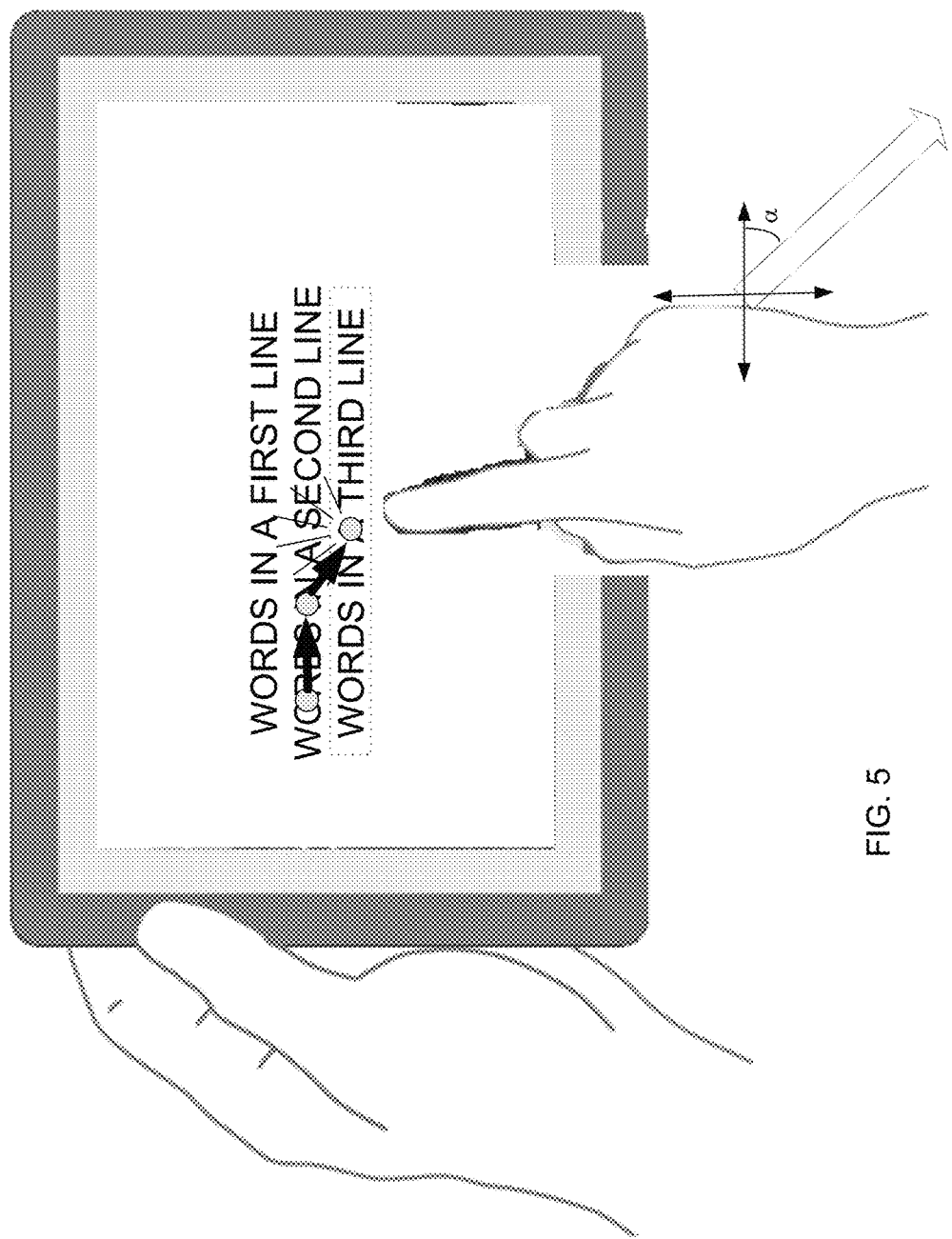
FIG. 5 is a sketch of a graphical user interface of a touchscreen computing device in which the user has indicated a second amount of content.

Regardless of the manner in which the direction of motion is determined or interpreted, FIG. 5 illustrates the manner in which the screen reader interprets motion in a different direction. In the scenario illustrated in FIG. 5, a user has initially moved the finger across the touchscreen in a direction parallel to the lines of text displayed on the screen. In this example, the motion initiates in a second line of text. In this scenario, the screen reader reads, word-by-word, the words in the indicated line as the finger passes over them.

Though, FIG. 5 illustrates that after passing partially over the second line by motion in a direction along that line of text, the user has moved the finger in a transverse direction, to pass over the third line. Though such motion positions the finger above a word in the third line, the screen reader selects a quantity of text based on the motion having a substantial transverse direction as a command to select units of text larger than words. In this example, motion transverse to a line indicates a command to select a line of text at a time. Accordingly, FIG. 5 shows that user input designating a location over the third line is interpreted as a command to read the entire third line.

In the example of FIG. 5, the motion of the finger that is interpreted as a command to read full lines of text at a time is not strictly perpendicular to the lines. Rather, as can be seen in FIG. 5, motion that deviates from the horizontal by an angle α was nonetheless interpreted as a command to select text for rendering verbally by line. The specific angular directions associated with commands to select different sized units is not critical to the invention. However, in this example, an angle α of 45° or more relative to the horizontal may be interpreted as a command to select content in units of lines. Conversely, an angle α of less than 45° may be interpreted as a command to select text in units of words.

In the embodiment illustrated, text is selected in units of one of two possible sizes, words and lines. In such an embodiment, motion along a line, whether to be left or right, corresponding to the backwards or forwards direction of a line of text, may be similarly treated. In the same vein, motion perpendicular to the lines of text, whether up or down, may be treated as a command to read text in units of lines. Though, in some embodiments, motions in different directions along a line of text may be treated as commands to read different sized units of text. For example, motion to the right along the line of text may be interpreted as a command to read text at the designated locations in units of words. Conversely, motion to the left along the line of text may be interpreted as a command to read text in units of characters. In a similar fashion, motion with a component perpendicular to lines of text, when in the downward direction, may be interpreted as a command to read the text in units of lines. Motion perpendicular to the lines of text in an upward direction may be interpreted as a command to read text at the designated locations in units of paragraphs. Though, it should be appreciated that the specific size of the units associated with motion in each direction is not critical to the invention and any suitable size units may be associated with motion in any direction. Moreover, it should be appreciated that an example in which four commands are associated with motion in four directions, motion in any suitable number of directions may be recognized and associated with any suitable number of commands to select text in units of any suitable size.

Figure 6:
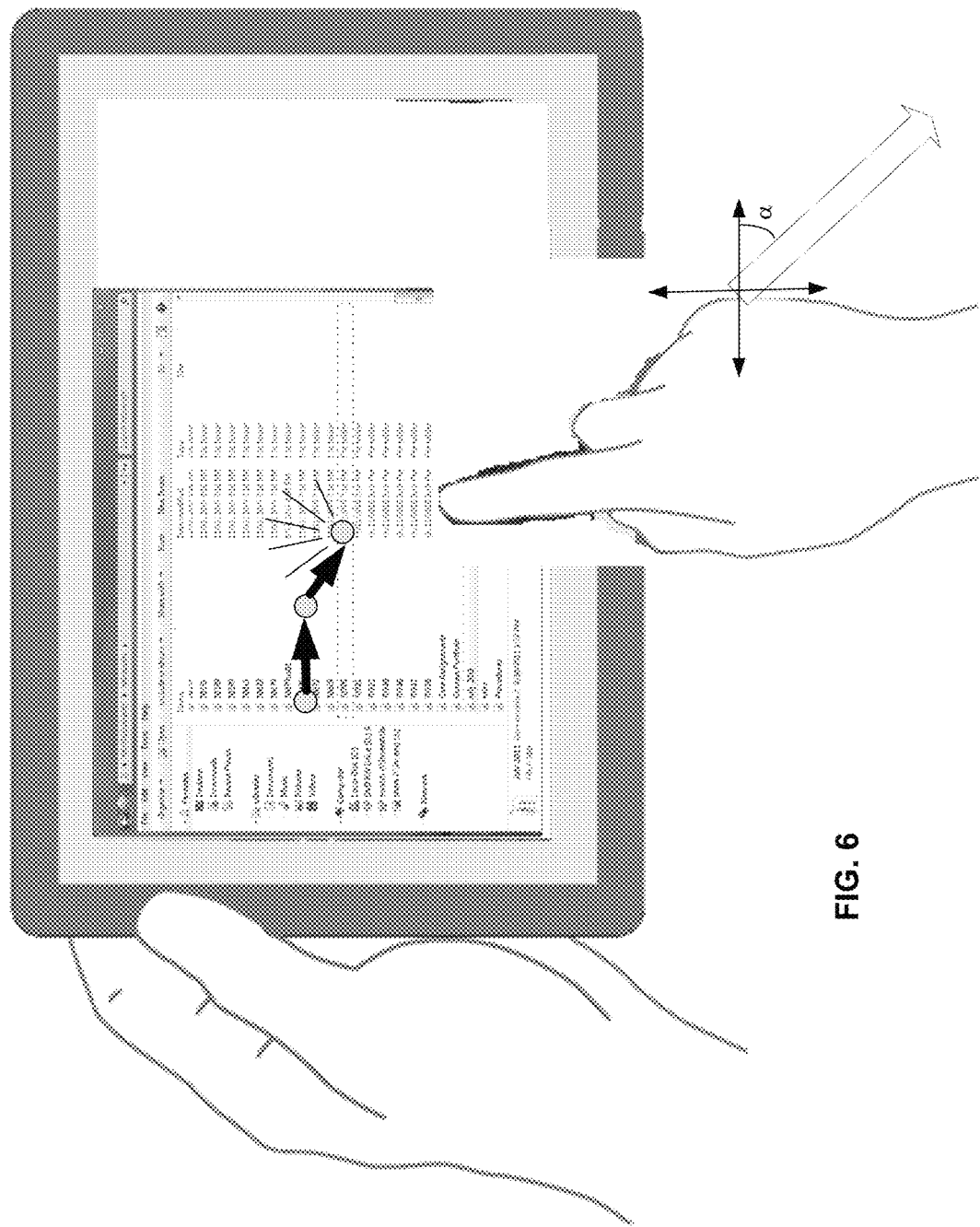
FIG. 6 is a sketch of a graphical user interface of a touchscreen computing device in which the user has indicated a second amount of content.

Further, it should be recognized that a screen reader is not limited to operating on content rendered as text. FIG. 6 illustrates a scenario in which content is rendered on a display with a combination of user interface elements, some of which are graphical components. A user accessing the displayed content with the aid of a screen reader may desire to have designated portions of that content, including the graphical elements, "read." In this context, a graphical element may be "read," by having the screen reader verbally render a name, label or other description of the graphical element.

For example, the user interface illustrated in FIG. 6 includes icons designating files. Each designated folder has descriptive text associated with it, such as a name or date information. Though, each folder is displayed with an icon of a file folder, revealing to a sighted user the nature of the content displayed. In this example, display of a file folder icon indicates that further information may be accessed by selecting the file folder icon through the graphical user interface and issuing an open command. Accordingly, as a user explores the content of the graphical user interface as depicted in FIG. 6, it may be useful, upon designating a location on the display screen that displays a file folder icon, it may be useful for the screen reader to indicate that the user interface element in that location is a file folder icon. Moreover, as illustrated in FIG. 6, a graphical user interface may conventionally display other user interface elements that are also graphical. Those other interface elements may include associated text or, in some scenarios, may appear without any associated text. For example, well-known graphical elements may be recognized by a user without descriptive text. As a specific example, the backwards arrow button, which controls navigation through a web browser, may appear without any descriptive text. Accordingly, when the user is operating a screen reader in an exploratory mode, the screen reader may verbally render information about such a graphical element when the user designates a location of the touchscreen containing that graphical element. Information about graphical elements may be rendered verbally in any suitable way, including using techniques as are known in the art.

Additionally, techniques as described herein may be used by a screen reader operating in an investigatory mode to control the amount of content verbally rendered in response to a user selection. As in the example of FIG. 5, FIG. 6 shows a pattern of motion across a graphical user interface that is initially horizontal but then includes a substantial transverse component. In this example, the initial designation of a location on the user interface may correspond to a folder icon. In response to that designation, the screen reader may verbally render a description revealing that the designated location contains an icon of a file folder.

As the user's finger moves horizontally across the display screen, the screen reader may verbally render descriptions of other icons or individual words encountered as part of that motion.

In the scenario illustrated in FIG. 6, after some period of horizontal motion, the user changes the direction of motion of the finger. In this example, the motion is at an angle α relative to the horizontal. Here, a exceeds a threshold angle used by the screen reader to differentiate between motions signifying different sized content units. Accordingly, the screen reader interprets motion in the direction a as an indication that the user would like to have content rendered in larger units. In this example, the larger units include the designated icon and information positioned to reveal a relationship to that icon. As a specific example, in the user interface of FIG. 6, information about a file is displayed on a line. Accordingly, motion in the direction a indicates to the screen reader to render the information shown on a selected line. That information, in this example may include a verbal indication that the line includes a graphical element representing a file, text representing a name of the file and text representing other attributes of the file. Though, it should be appreciated that the specific information verbally rendered is not critical to the invention.

Moreover, it should be appreciated that the manner in which logical groupings of information are formed is not critical to the invention. For example, in some embodiments, motion of a pointing device in a first direction may be interpreted as a command to verbally render each user interface element individually as it is designated by a pointing device. Motion in a second direction may be interpreted as a command to render a logical grouping of interface elements. For example of an approach in which a logical grouping may be defined, logical interface elements appearing in the same display window may be considered to form a logical group.

In other embodiments, user interface elements aligned in the same level of a display hierarchy may be considered to represent a logical grouping. For example, the user interface of FIG. 6 includes a navigation pane. The navigation pane is segmented into sections, and each section is shown to include a subsection containing choices. Though not shown in FIG. 6, each subsection may contain further subsections, defining a hierarchy with multiple levels. In some embodiments, options contained within a subsection that are at the same level of the hierarchy may be taken as a logical group for purposes of determining the amount of information to be rendered verbally. Though, it should be recognized that any suitable level of the hierarchy may be used to define related information, and in some embodiments, motion in different directions may define different levels of the hierarchy to be used in selecting related information.

As a further example, the user interface illustrated in FIG. 6 includes user other interface elements. For example, the user interface includes menu bars and groups of related controls, such as controls to close, maximize or minimize a display window. Other controls, such as a magnifying glass icon that triggers execution of a search command may be displayed in conjunction with related user interface elements, such as a text box through which a user may specify a search query. A screen reader implemented using techniques as described herein may group these user interface elements in any suitable way and associate motion of a pointing device across the touchscreen as different commands to verbally render this content in different sized units defined in any suitable way to logically group the user interface elements. For example, when motion I occurring in a first direction, each of these user interface elements may be verbally rendered separately. Motion is a second direction may result in a logical group being rendered, which may be defined as all of the user interface elements at the same level of hierarchy in a menu or that relate to the same control function, such as the magnifying glass and its associated text box.

Accordingly, it should be appreciated that a screen reader implemented according to the techniques described herein may provide substantial flexibility but should not be limited to the specific embodiments disclosed as examples.

Figure 7:
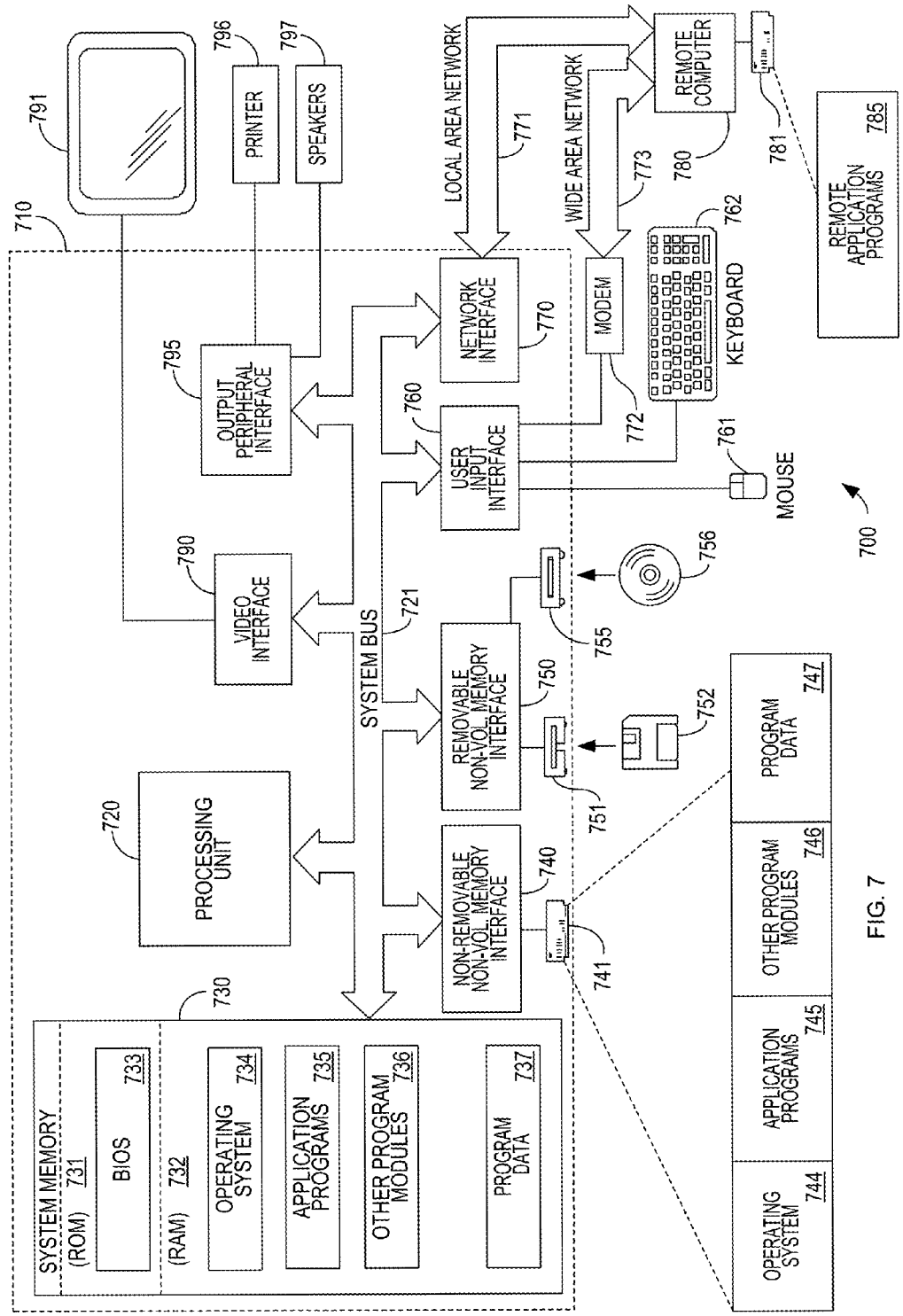
FIG. 7 is a functional block diagram of an exemplary computing device in which embodiments of the invention may operate.

FIG. 7 illustrates an example of a suitable computing system environment 700 on which the invention may be implemented. The computing system environment 700 is only one example of a suitable computing environment and is not intended to suggest any limitation as to the scope of use or functionality of the invention. Neither should the computing environment 700 be interpreted as having any dependency or requirement relating to any one or combination of components illustrated in the exemplary operating environment 700.

The invention is operational with numerous other general purpose or special purpose computing system environments or configurations. Examples of well-known computing systems, environments, and/or configurations that may be suitable for use with the invention include, but are not limited to, personal computers, tablet computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The computing environment may execute computer-executable instructions, such as program modules. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 7, an exemplary system for implementing the invention includes a general purpose computing device in the form of a computer 710. Components of computer 710 may include, but are not limited to, a processing unit 720, a system memory 730, and a system bus 721 that couples various system components including the system memory to the processing unit 720. The system bus 721 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 710. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable, volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through an non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744, application programs 745, other program modules 746, and program data 747. Note that these components can either be the same as or different from operating system 734, application programs 735, other program modules 736, and program data 737. Operating system 744, application programs 745, other program modules 746, and program data 747 are given different numbers here to illustrate that, at a minimum, they are different copies.

In some embodiments, a screen reader as described herein may be implemented as a component of an operating system. Though, it should be appreciated that a screen reader may be implemented as an application or in any other suitable way.

A user may enter commands and information into the computer 710 through input devices such as a keyboard 762 and pointing device 761, commonly referred to as a mouse, trackball or touch pad. Other input devices (not shown) may include a microphone, joystick, game pad, satellite dish, scanner, or the like. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790.

In the embodiment illustrate, monitor 791 may be implemented as a touch screen display. Accordingly, the display may serve as both an output and an input device. In addition to the monitor, computers may also include other peripheral output devices such as speakers 797 and printer 796, which may be connected through a output peripheral interface 795.

The computer 710 may operate in a networked environment using logical connections to one or more remote computers, such as a remote computer 780. The remote computer 780 may be a personal computer, a server, a router, a network PC, a peer device or other common network node, and typically includes many or all of the elements described above relative to the computer 710, although only a memory storage device 781 has been illustrated in FIG. 7. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on memory device 781. It will be appreciated that the network connections shown are exemplary and other means of establishing a communications link between the computers may be used.

Having thus described several aspects of at least one embodiment of this invention, it is to be appreciated that various alterations, modifications, and improvements will readily occur to those skilled in the art.

For example, though embodiments of the invention were illustrated in connection with a touch screen computing device, techniques as described herein could be applied in connection with other types of human interfaces. For example, direction of motion of mouse pointer across a screen may similarly be used to indicate a quantity of content to render verbally.

As another example, it was described that direction of motion controlled the size of units of text rendered verbally. Other characteristics of motion of a finger or other input device could be used to control the size of units of text. For example, the speed of motion could be used to control the size of the units.

Such alterations, modifications, and improvements are intended to be part of this disclosure, and are intended to be within the spirit and scope of the invention. Further, though advantages of the present invention are indicated, it should be appreciated that not every embodiment of the invention will include every described advantage. Some embodiments may not implement any features described as advantageous herein and in some instances. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. As is apparent from the foregoing examples, a computer readable storage medium may retain information for a sufficient time to provide computer-executable instructions in a non-transitory form.

Such a computer readable storage medium or media can be transportable, such that the program or programs stored thereon can be loaded onto one or more different computers or other processors to implement various aspects of the present invention as discussed above. As used herein, the term "computer-readable storage medium" encompasses only a computer-readable medium that can be considered to be a manufacture (i.e., article of manufacture) or a machine. Alternatively or additionally, the invention may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of operating a computing device to verbally render information on a display, the method comprising:
   receiving, user input representing a single contact gesture identifying a desired location on the display and indicating a direction of motion of a pointing device across the display, the motion crossing over content;
   determining whether the direction of motion with the user interface is at least one of a horizontal motion or a vertical motion;
   mapping, a unit of size for verbally rendering content to at least one of a first size corresponding to at least one of individual words or characters based on determining that the direction of motion corresponds to the horizontal motion associated with the single contact gesture or to a second size corresponding to one or more entire lines of text based on determining that the direction of motion corresponds to the vertical motion associated with the single contact gesture, wherein mapping the unit of size includes selecting content to be rendered according to the first size or the second size based on the direction of motion relative to a threshold angle that differentiates between motions signifying different sized content units; and
   verbally rendering information on the display according to the unit of size and based on the direction of motion with the user interface.

2. The method of claim 1, wherein the information is presented on the display as lines of text.

3. The method of claim 1, wherein the first size further comprises individual graphical elements.

4. The method of claim 3, wherein:
   the graphical elements comprise graphical user interface control objects; and
   verbally rendering information on the display in the unit of size comprises rendering verbally a label associated with the control object.

5. The method of claim 1, further comprising:
   monitoring motion of the pointing device across the screen while operating in a first mode in which information is rendered in the first size as the pointing device indicates each unit of information of the first size;
   based on the monitored motion, entering a mode in which information is rendered in the second size as the pointing device indicates each unit of information of the second size.

6. The method of claim 1, wherein the display is a touch screen.

7. The method of claim 1, wherein in response to the direction of motion exceeding the threshold angle, determining that the direction of motion corresponds to the vertical motion; and
   in response to the direction of motion being less than or equal to the threshold angle, determining that the direction of motion corresponds to the horizontal motion.

8. A non-transitory computer-readable medium storing instructions executable by at least one processor of a computing device having a display and a sound output, comprising at least one instruction for:

receiving user input representing a single contact gesture identifying a desired location on the display and indicating a direction of motion of a pointing device across the display, the motion crossing over content;

determining whether the direction of motion with the user interface is at least one of a horizontal motion or a vertical motion;

mapping a unit of size for verbally rendering content to at least one of a first size corresponding to at least one of individual words or characters based on determining that the direction of motion corresponds to the horizontal motion associated with the single contact gesture or to a second size corresponding to one or more entire lines of text based on determining that the direction of motion corresponds to the vertical motion associated with the single contact gesture, wherein mapping the unit of size includes selecting content to be rendered according to the first size or the second size based on the direction of motion relative to a threshold angle that differentiates between motions signifying different sized content units: and verbally rendering information on the display according to the unit of size and based on the direction of motion with the user interface.

9. The non-transitory computer-readable medium of claim 8, further comprising at least one instruction for receiving user input to designate a mode of interaction for investigation of displayed content.

10. The non-transitory computer-readable medium of claim 9, wherein:
the mode of interaction comprises a first mode; and
the computer-readable medium: further comprises computer executable instructions for operating the computing device is a second mode of interaction in which content is rendered verbally without receiving express user input through the display.

11. The non-transitory computer-readable medium of claim 8, wherein selecting the unit of content comprises selecting a word when in response to the direction of motion corresponds corresponding to the horizontal motion and selecting a line of text when in response to the direction of motion corresponds corresponding to the vertical motion based on a downward motion.

12. The non-transitory computer-readable medium of claim 8, wherein selecting the unit of content comprises selecting a paragraph when in response to the direction of motion corresponds corresponding to the vertical motion based on an upward motion.

13. The non-transitory computer-readable medium of claim 8, wherein selecting the unit of content comprises selecting a textual description of a control element when in response to the direction of motion corresponds corresponding to the horizontal motion and selecting the textual description of the control element in conjunction with a textual description of adjacent displayed information when in response to the direction of motion corresponds corresponding to the vertical motion based on a downward motion.

14. A computing device, comprising:
a touch screen;
a speaker; and
at least one processor configured to:
receive user input representing a single contact gesture identifying a desired location on the display and indicating a direction of motion of a pointing device across the display, the motion crossing over content;
determine whether the direction of motion with the user interface is at least one of a horizontal motion or a vertical motion;
map a unit of size for verbally rendering content to at least one of a first size corresponding to at least one of individual words or characters based on determining that the direction of motion corresponds to the horizontal motion associated with the single contact gesture or to a second size corresponding to one or more entire lines of text based on determining that the direction of motion corresponds to the vertical motion associated with the single contact gesture, wherein mapping the unit of size includes selecting content to be rendered according to the first size or the second size based on the direction of motion relative to a threshold angle that differentiates between motions signifying different sized content units; and
verbally render information on the display according to the unit of size and based on the direction of motion with the user interface.

15. The computing device of claim 14, further comprising a text-to-speech converter, and generating control signals to the speaker comprises providing the selected unit of content to the text-to-speech converter.

16. The computing device of claim 14, wherein the processor is configured to select a paragraph in response to the direction of motion corresponding to the vertical motion based on an upward motion.

17. The computing device of claim 14, wherein:
the computing device further comprises an orientation sensor; and
selecting content comprises selecting a word in response to the direction of motion corresponding to the horizontal motion and selecting a line of text in response to the direction of motion corresponding to the vertical motion based on a downward motion.

18. The computing device of claim 14, wherein, in response to the identified unit of content being a control element, selecting content comprises selecting a textual description of the control element in response to the direction of motion corresponding to the horizontal motion and selecting the textual description of the control element in conjunction with a textual description of adjacent displayed information in response to the direction of motion corresponding to the vertical motion based on a downward motion.

19. The computing device of claim 14, wherein the computing device has a tablet form factor.

* * * * *